United States Patent [19]
Moore

[11] 3,829,150
[45] Aug. 13, 1974

[54] APPARATUS FOR REMOVABLE SECURING SOUND-PROOFING MATERIAL TO A CONSTRUCTION VEHICLE

[75] Inventor: James C. Moore, Clackamus, Oreg.
[73] Assignee: Portland Wire & Iron Works, Portland, Oreg.
[22] Filed: Nov. 13, 1972
[21] Appl. No.: 305,740

[52] U.S. Cl............... 296/39 A, 52/404, 85/35, 85/DIG. 2, 181/35 G
[51] Int. Cl.............................................. E04b 1/74
[58] Field of Search.......... 296/39 R, 39 A; 52/404, 52/406, 407; 85/DIG. 2, 35, 36; 181/35 G

[56] References Cited
UNITED STATES PATENTS
| | | | |
|---|---|---|---|
| 2,452,173 | 10/1948 | Zwiebel | 85/35 X |
| 2,993,110 | 7/1961 | Godley | 52/404 X |
| 3,129,444 | 4/1964 | Kahn | 85/36 X |
| 3,238,835 | 3/1966 | Rosenberg | 52/407 X |
| 3,273,441 | 9/1966 | Biesecker | 85/35 |

FOREIGN PATENTS OR APPLICATIONS
| | | | |
|---|---|---|---|
| 933,050 | 7/1963 | Great Britain | 85/35 |
| 1,455,856 | 6/1969 | Germany | 296/39 R |

Primary Examiner—Robert J. Spar
Assistant Examiner—Leslie J. Paperner
Attorney, Agent, or Firm—Dawson, Tilton, Fallon & Lungmus

[57] ABSTRACT

Apparatus is disclosed for removably securing a covering of sound-proofing material to a construction vehicle. The apparatus includes a flexible button which has a smooth-walled sleeve which is force fitted over a threaded weld stud. The button is flexible enough so that it can be applied to, and removed from the weld stud without the need of a tool, yet it is hard enough so that the stud will not penetrate it when impacted.

1 Claim, 4 Drawing Figures

PATENTED AUG 13 1974 3,829,150

APPARATUS FOR REMOVABLE SECURING SOUND-PROOFING MATERIAL TO A CONSTRUCTION VEHICLE

DETAILED DESCRIPTION

The present invention relates to construction vehicles; and more particularly, it relates to apparatus for sound-proofing enclosed areas of the vehicle. Such areas may include an engine housing or the like; but the primary area of application is the operator's cab of a large construction vehicle so as to acoustically isolate the operator from external noise.

In the past, a sheath or covering of sound-proofing material has been applied to the interior of the operator's cabs of construction vehicles by using threaded weld studs welded to the walls and by holding the sheathing with rigid buttons having internally threaded sleeves. Such buttons have been troublesome, however, in that they must be applied to and removed from their associated studs with the aid of tools and only through the laborious and prolonged turning of the buttons.

The present invention provides for attaching a sheath of sound-proofing material to a vehicle wall by means of a plurality of fasteners, each including an externally grooved metal stud welded at its base to the wall and projecting outwardly thereof, and a one-piece cap or button of resilient material.

The button has a disc-shaped head and a cylindrical sleeve with a smooth interior wall. The sleeve has an interior diameter just large enough to permit it to be pushed onto an associated stud with a mere hand action, and it is thus held by the exterior ridges or threads on the stud. Thus, the button can be assembled to or removed from an associated ridged stud without the need for a special tool or the need to twist the button onto or off of the stud.

A conical guide surface at the leading edge of the sleeve centers it on a stud for assembly. The material of the cap is soft enough to facilitate hand placement on the stud yet hard enough so that upon impact the stud will yield before it penetrates the button material. For a neoprene rubber, I have found that a durometer reading in the range of 70–90 on the A scale is preferred.

Other features and advantages of the present invention will be apparent to persons skilled in the art from the following detailed description of a preferred embodiment accompanied by the attached drawing wherein identical reference numerals will refer to like parts in their various views.

THE DRAWING

DETAILED DESCRIPTION

Figure 1:
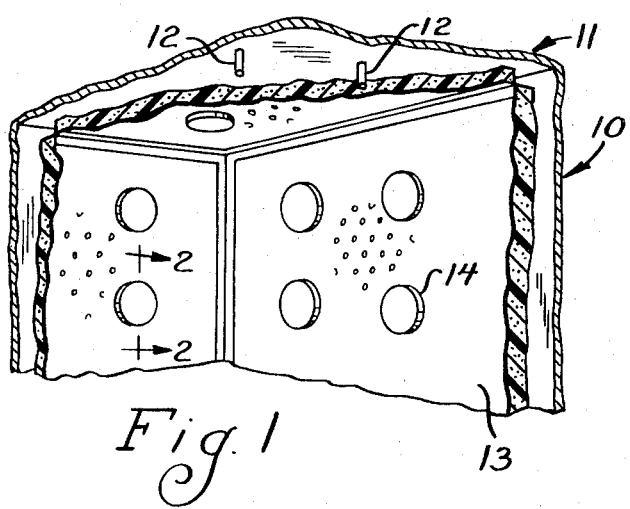
FIG. 1 is a fragmentary lower perspective view of a corner of an operator's cab for a construction vehicle equipped with sound-proofing material secured to the wall in accordance with the present invention.

Referring first to FIG. 1, there is shown an upper corner of a fragment of an operator's cab of a construction vehicle wherein wall panels are generally designated 10 and a ceiling 11. It will be appreciated that both the wall 10 and ceiling 11 may be metal panels supported by the frame of a rollover protective system. However, as mentioned above, the present invention could also be used on the interior of an engine housing to suppress the transmission of noise.

In the embodiment of FIG. 1, the panels of the wall and ceiling are provided with threaded weld studs 12 at spaced locations. The interior of the wall and ceiling panels 10, 11, are covered with sound suppression material 13. The sound suppression material 13 is preferably used to cover almost the entire interior of the operator's cab in an effort to reduce the sound level within the cab to as low as possible. This enables an operator to work the vehicle for a longer time. At the same time, however, by covering the entire interior of the vehicle, the various elements of the machinery or vehicle beneath the operator's cab are also covered so that the material 13 must be removed before access can be obtained for field servicing. In addition, the sound suppression material 13 is relatively fragile considering the type of environment in which a heavy construction vehicle operates, and it must be removed periodically, either to steam clean the interior of the cab or to, for example, clean up oil spills and the like.

In practice, the weld studs 12 are located on the interior surface of the walls and ceiling, as needed. To the extent possible, the weld studs are located in remote areas or toward adjacent panels so as to minimize the chance that in the event of an accident, an operator will strike one of the fasteners. However, it will be appreciated that in equipment of this type there is the possibility of a rollover and there is at least some chance that an operator could come into contact with a fastener.

The material 13 is held to the weld studs 12 by means of buttons or caps 14 which are placed over and cover the weld studs.

Figure 2:
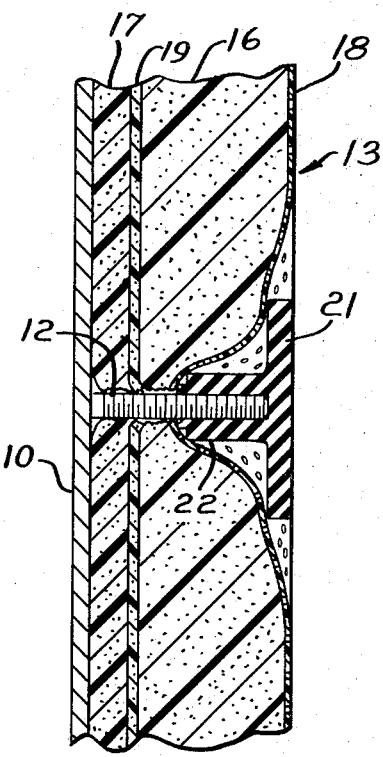
FIG. 2 is a fragmentary vertical cross-sectional view taken through the sight line 2—2 of FIG. 1.

Referring now to FIG. 2, the sound-suppression material 13 is of a type commercially available. It includes an outer, relatively thick layer 16 of flexible plastic foam, an inner, relatively thin layer 17 of flexible plastic foam, an outer perforated cover 18, and a relatively rigid but flexible bonding layer 19 joining the foam layers 16, 17 together.

Once the weld studs 12 are placed and welded to the panel 10, the sound-isolating material may be forced over the weld stud 12 until it punches through. Alternatively, a small lead hole may be formed and then the weld stud punched through.

The button 14 includes a generally disc-shaped head 21 and a cylindrical sleeve 22. The sleeve 22 is provided with a central smooth-wall bore 24 of a diameter to fit over the threaded stud 12 while firmly engaging the ridges of the stud. It will be appreciated that although the illustrated weld stud 12 is threaded, circular grooves or other equivalent grooves may equally well be used in place of the helical screw thread. The function of the ridges associated with the grooves is to engage the smooth wall 25 of the bore 24 and hold the button in place.

The distal end of the sleeve 22 is provided with a reduced annular portion 26 having a frusto-conical leading guide surface 27 for centering the button onto a weld stud during assembly.

Figure 3:
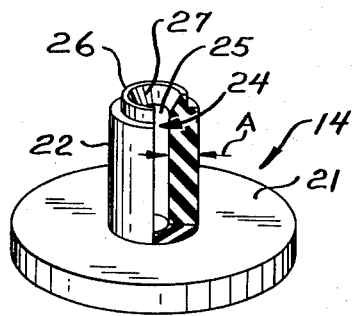
FIG. 3 is a perspective view of a button according to the present invention with a portion of the sleeve cut away to show the interior.
Figure 4:
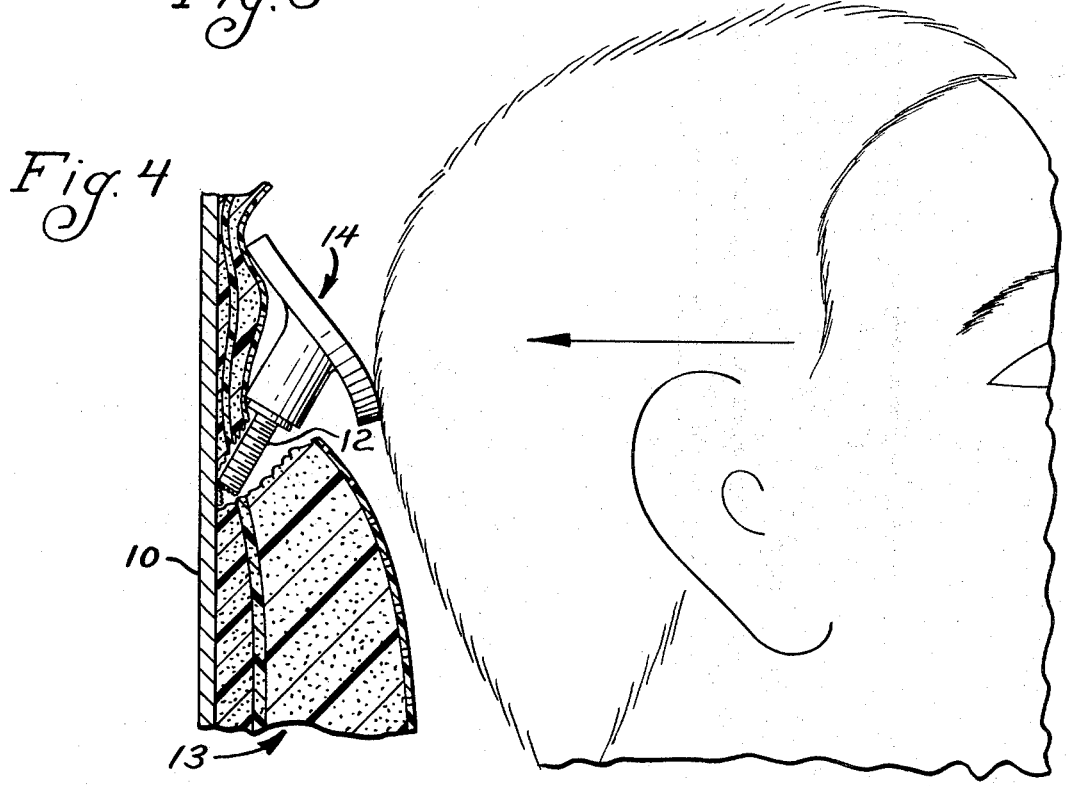
FIG. 4 is an illustration similar to FIG. 2, showing the yielding of the stud before penetration of the button upon impact.

The button 12 may be made of any natural or synthetic flexible, resilient material such as rubber, neoprene, polyvinyl chloride or the like. The hardness of the material is such that it is soft enough to facilitate force-fitting of the button onto the weld stud and removal therefrom, while at the same time, preventing penetration of the weld stud in the event of impact, as schematically illustrated in FIG. 4. The thickness of the head 21 and the annular wall forming the sleeve 22 cooperates with the hardness of the material to prevent penetration. Preferably the thickness of the annular wall of the sleeve 22 (as defined by the dimension arrows A in FIG. 3) as well as that of the head is about five thirty-seconds in. I have found that if the thickness of the sleeve is any less than that specified, it will not exhibit the kind of holding power that is desired. The button 14 may be manufactured in any conventional manner, such as molding, machining, etc.

Further, the diameter of the stud 12 is not critical, the dimensions of the button 14 may be adjusted to accommodate any stud within reason. It is important, however, that the fastener be designed such that upon impact, as illustrated in FIG. 4, the stud 12 yield, either by bending or breaking, before any portion of the stud penetrates the body of the button 14. The resulting safety features become apparent. Yet, with the inventive fastener, it has been found that the jobs of installing, removing and replacing sound-proofing material has been greatly facilitated because the button 14 can be installed simply by pushing it over the grooved stud 12, and it may also be removed by a simple hand motion without having to unscrew it. No special tools are needed or required.

Having thus described in detail a preferred embodiment of the invention, persons skilled in the art will be able to modify certain of the structure which has been illustrated and to substitute equivalent materials for those disclosed while continuing to practice the principle of the invention; and it is, therefore, intended that all such modifications and substitutions be covered as they are embraced within the spirit and scope of the appended claims.

I claim:

1. Apparatus for soundproofing an area of a construction vehicle surrounded by panels comprising: a plurality of externally grooved weld studs secured at spaced locations to said panels and projecting inwardly thereof to provide a non-pointed distal end; a layer of soundproofing material covering the interior of said walls, said studs projecting at least partially through said material; and a button for each stud, including a head and a sleeve defining a smooth wall bore for fitting over an associated stud and being held by the grooves thereof, said button being formed from a material soft enough to permit force fitting of said sleeve over an associated stud without turning, the head of said button being a disc-shaped member having a thickness of approximately five thirty-seconds in. and the thickness of the annular wall of said sleeve being approximately five thirty-seconds in., said button material being of a hardness and cooperating with the thickness of said sleeve and said head to prevent penetration of the body of said button by said stud upon impact, prior to the yielding of said stud under said impact; said sleeve further defining at its mouth a frusto-conical guide surface for guiding said button into engagement with an associated stud during installation of said soundproofing material.

* * * * *